(No Model.)
W. M. BOND.
CLOVER HARVESTER ATTACHMENT FOR MOWERS.
No. 558,478. Patented Apr. 21, 1896.
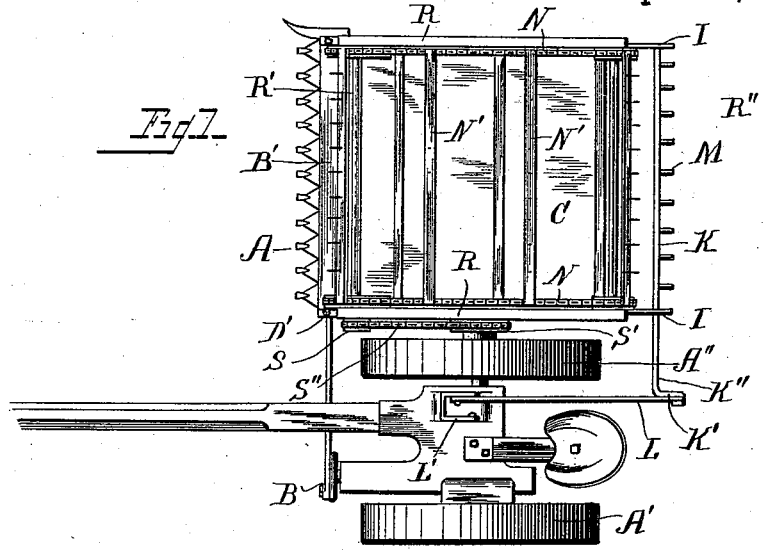
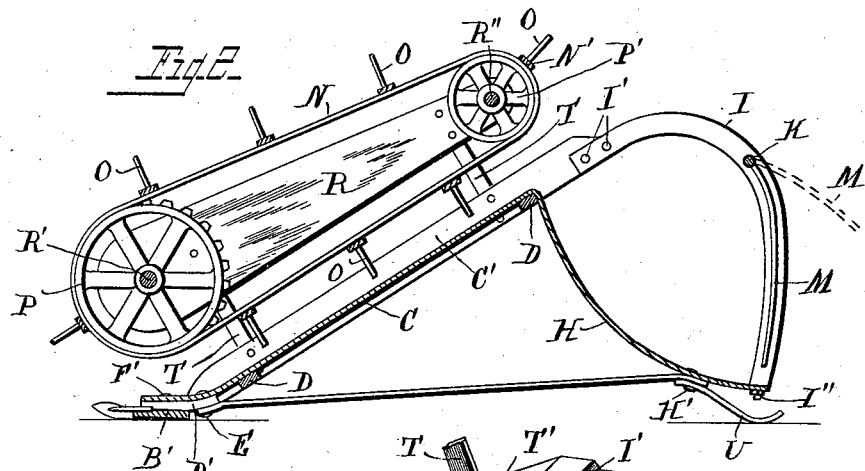
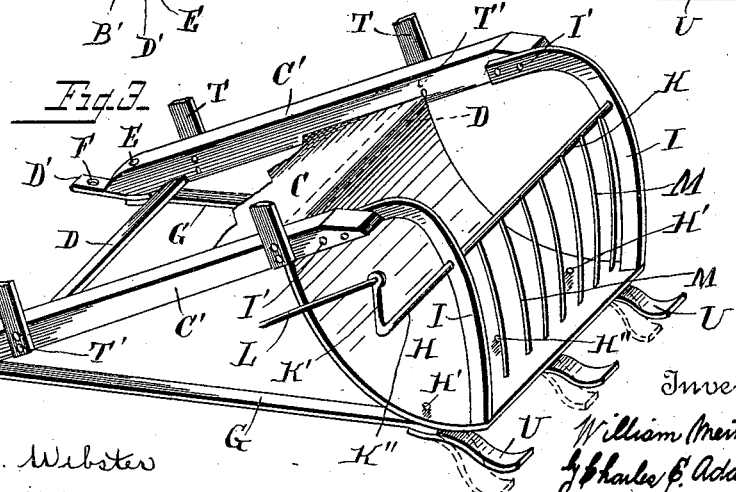
Witnesses
Carroll J. Webster
Winthrop T. Parker
Inventor
William Merton Bond
Charles E. Adamson
his Attorney

UNITED STATES PATENT OFFICE.

WILLIAM MERTON BOND, OF NEW CASTLE, INDIANA.

CLOVER-HARVESTER ATTACHMENT FOR MOWERS.

SPECIFICATION forming part of Letters Patent No. 558,478, dated April 21, 1896.

Application filed December 28, 1895. Serial No. 573,600. (No model.)

*To all whom it may concern:*

Be it known that I, WILLIAM MERTON BOND, a citizen of the United States, residing at New Castle, in the county of Henry and State of Indiana, have invented certain new and useful Improvements in Clover-Harvester Attachments for Mowers; and I do hereby declare the following to be a full, clear, and exact description of the invention, such as will enable others skilled in the art to which it appertains to make and use the same.

This invention relates to a new and useful improvement in clover-harvester attachments for mowers; and it consists in the construction and arrangement of parts hereinafter described, and definitely pointed out in the claims.

The aim and purpose of this invention is to construct an attachment which can be readily attached to or detached from the finger-bar of an ordinary mower to gather up the cut clover and elevate it to a suitable receptacle, and when a sufficient amount has been accumulated to dump the clover upon the ground in windrows and ready for the huller. These and other objects not hereinbefore specified are accomplished in the construction illustrated in the accompanying drawings, wherein like letters of reference indicate corresponding parts in the several views, and in which—

Figure 1 is a top plan view of an ordinary mower with my attachment applied thereto. Fig. 2 is a side elevation of the attachment applied to the finger-bar of a mower, parts being in section; and Fig. 3 is a detail perspective view of the platform-frame and receptacle of the attachment.

In the drawings, A represents an ordinary mower supported upon the wheels A' A''. B represents the drive-gear for the cutter-knives, and B' the finger-bar. These parts are of the ordinary construction, and it is not thought necessary to enter into a detail description thereof.

The attachment consists of an inclined platform C, which has its lower end extending horizontally and adapted to rest on the finger-bar, and the side bars C' on opposite sides of the platform and extending the length thereof. These side bars serve to keep the cut clover on the platform when the same is being elevated into the receptacle, as hereinafter described.

D represents cross-bars, which have their opposite ends secured to the side bars forming a supporting-frame and upon which the platform is supported. Secured to the forward ends of the side bars are projecting pieces or straps D'. These straps are curved upward at their rear ends and rigidly secured to the side bars by suitable bolts E, as hereinafter described. The forward ends of these straps are flat and are adapted to rest upon the finger-bar of the mower and are provided with apertures F, through which pass bolts F', which pass into suitable apertures in the finger-bar, to detachably secure the straps to the said finger-bar.

G represents horizontal braces extending from the front lower ends of the side bars rearwardly. The forward ends of these braces, as shown in Figs. 2 and 3, are slightly curved to correspond with the curve in the rear ends of the straps and pass under the straps and the braces and straps are rigidly secured to the side bars by the bolts E.

H represents the curved bottom of the receptacle. The upper end of this bottom is secured to the inclined platform C by any suitable means, or may be formed of an integral sheet-iron piece, as shown in the drawings. The lower end of this bottom H is secured to the ends of the braces G by bolts H', which pass through suitable apertures in the bottom and ends of the braces. It will thus be seen that the bottom H performs the double purpose of acting as a bottom for the receptacle and a brace or support for holding the supporting-frame and platform in an inclined position.

Secured to the rear end of the side bars C' are the curved bars I rigidly secured by the bolts I', passing through apertures in the ends of the side bars and curved bars. These curved bars extend downwardly and have their lower ends secured to the extreme outer end of the bottom H by bolts I''.

K represents a rod extending across the rear of the receptacle and passing through the curved bars. One end of this rod is extended, as shown at K'', and has rigid thereon an arm K'. Pivoted to the end of this arm is a connecting-rod L, which extends forward and is pivoted to a foot-lever L' on the main frame of the mower and in operative proximity to the seat for the driver. Secured to this rod K are depending curved fingers M, which extend down to adjacent the bottom H, forming a gate for the rear end of the receptacle. It will thus be seen, after the clover has been elevated into the receptacle, as hereinafter described, and a sufficient amount has accumulated therein, the gate is opened by the means described and the clover is dumped on the ground in windrows ready for the huller. By forming the bottom H curved and inclined, as shown, no clover can lodge on the bottom, but all will drop upon the ground when the gate is opened.

N represents elevator-chains, which are formed of ordinary sprocket-chains. These chains are united by the cross-bars N' at suitable intervals. Supported upon these cross-bars are the vertical fingers O. These chains are supported on the sprocket-wheels P and the smooth pulleys P'.

R represents the side bars of the elevator-frame, which are connected by the cross-rods R' R'', arranged at opposite ends of the side bars. Upon the rod R' are journaled the sprocket-wheels P on opposite ends of the rod and on the inner sides of the side bars R. One end of the rod R' is extended beyond the side bars and has a sprocket-wheel S rigid thereon.

S' is a sprocket-wheel rigid on the wheel A'' of the mower. The sprocket-wheels S and S' are connected by the sprocket-chain S''. It will thus be seen that when motion is imparted to the mower, by means of the sprocket-wheel S S' and the chain S'', the elevator is actuated to elevate the cut clover into the receptacle. Upon the opposite ends of the rod R'' are journaled the smooth pulleys P' and on the inner sides of the side bars.

The elevator-frame is supported on the side bars C' by means of the stays T, which extend downward from the side bars R and are rigidly secured to the side bars C' by means of suitable bolts T'. It will thus be seen that the fingers on the elevator-chain will reach nearly to the platform C and elevate the cut clover up into the receptacle over the inclined platform and where it can be dumped, as hereinbefore described. It will also be noticed that this platform is extended over the finger-bar, so that no clover can reach the ground, but all will be passed up the platform.

U represents curved supporting-bars, which are pivoted to the outer end of the bottom and which rest upon the ground and support the rear end of the attachment. By pivoting these supporting-bars when the machine is turned they will swing, as shown in dotted lines, Fig. 3. In the drawings I show three of these bars, although it is evident a more or less number could be used. The outer bars are pivoted to the bottom by means of the bolts H', which are also used to unite the curved bars and the bottom, and the central supporting-bar is pivoted by a suitable bolt. (Not shown.)

It will thus be seen from the above-described construction that this attachment can be readily attached or detached from the mower without in any manner altering the construction thereof or changing the functions of the parts.

Having thus described my invention, what I claim as new, and desire to secure by Letters Patent, is—

1. An attachment for mowers, secured to the finger-bar of the mower consisting of an inclined platform extending from the finger-bar, a receptacle at the rear end of the inclined platform, a gate for the receptacle, an elevator above the platform, and means extending adjacent the seat for the driver for actuating the gate, substantially as described.

2. An attachment for mowers, secured in the rear of the cutters, consisting of an inclined platform, a receptacle at the rear of the platform, a horizontal brace connecting the front of the platform and bottom of the receptacle, an elevator above the platform and swinging supporting-bars pivoted to the rear end of the receptacle for supporting the same above the ground, substantially as described.

3. An attachment for mowers, consisting of an inclined frame adapted to be secured to the rear of the cutters, a platform on the frame, a receptacle at the rear of the frame having a curved inclined bottom and an open top, a horizontal brace connecting the front of the frame with the bottom of the receptacle, a gate for the receptacle an elevator above the platform and a connection between the elevator and a movable part of the mower for operating the elevator, substantially as described.

4. An attachment for mowers secured to the finger-bar of the mower, consisting of an inclined platform, the front end of the platform formed horizontal and extending over the rear of the finger-bar and the rear end of the platform having an integral extension bent downwardly and curved forming the bottom of a receptacle, a swinging gate for the receptacle, and an elevator above the inclined platform, substantially as described.

In witness whereof I affix my signature in presence of two witnesses.

WILLIAM MERTON BOND.

Witnesses:
C. A. PHELPS,
O. S. BROOKSHU.